US006988976B2

(12) United States Patent
Potter

(10) Patent No.: US 6,988,976 B2

(45) Date of Patent: Jan. 24, 2006

(54) CONTROL OF TRANSMISSION SHIFT POINTS FOR HYBRID VEHICLE HAVING PRIMARY AND SECONDARY POWER SOURCES

(75) Inventor: James Potter, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 10/804,422

(22) Filed: Mar. 19, 2004

(65) Prior Publication Data

US 2005/0209046 A1 Sep. 22, 2005

(51) Int. Cl.

*B60K 41/04* (2006.01)
*G06F 7/00* (2006.01)
*G06F 17/00* (2006.01)
*G06F 19/00* (2006.01)

(52) U.S. Cl. ........................................ 477/115; 701/66

(58) Field of Classification Search ................ 477/115, 477/902; 701/55, 66

See application file for complete search history.

(56) References Cited

U.S. PATENT DOCUMENTS 5,884,201 A * 3/1999 Kawai ......................... 701/22
5,944,630 A 8/1999 Omote
6,346,063 B1 * 2/2002 Kondo et al. ............... 477/143
6,390,949 B1 * 5/2002 Kondo et al. ............... 477/143
6,482,125 B2 * 11/2002 Urasawa ..................... 477/107

FOREIGN PATENT DOCUMENTS

EP 1393964 3/2004

* cited by examiner

*Primary Examiner*—Tisha Lewis

(74) *Attorney, Agent, or Firm*—David B. Kelley; MacMillan, Sobanski & Todd

(57) ABSTRACT

A method, used in a powertrain of a motor vehicle having an engine, a secondary power source, and a step-change automatic transmission for driving a load, controls an upshift from a current gear to a next gear and includes the steps of establishing first shift points of a demanded engine output and a corresponding vehicle speed, at which the upshift would occur if the engine were the only power source. The length of a first period in which energy is available to the secondary power source is determined. The length of a second period for the current vehicle speed to increase to a target vehicle speed of a first shift point whose corresponding demanded engine output is equal to a combined current demanded output of the engine and secondary power source is determined. The upshift is produced if the length of the second period is equal to or greater than the length of the first period.

13 Claims, 5 Drawing Sheets

| Gear | 40 | 28 | 20 | 38 | 2/4 Band |
|---|---|---|---|---|---|
| 1st | | X | | X | |
| 2nd | | X | | | X |
| 3rd | | X | X | | |
| 4th | | | X | | X |
| REV | X | | | X | |

CONTROL OF TRANSMISSION SHIFT POINTS FOR HYBRID VEHICLE HAVING PRIMARY AND SECONDARY POWER SOURCES

BACKGROUND OF THE INVENTION

The invention relates to the control of an automatic transmission for a vehicle having a hybrid powertrain, in which both an internal combustion engine and a secondary power source, such as an electric motor, hydraulic motor, pressurized fluid accumulator or flywheel, provide power to the transmission input.

In hybrid electric vehicle applications, in which a secondary power source and engine supply torque to accelerate the vehicle, transmission gearshifts should occur at a lower vehicle speed than the speed at which they would occur if the engine alone were providing power. Producing earlier gearshifts improves fuel economy, but there is a need to determine the correct combination of operating conditions at which to produce the gearshifts so that they are stable and consistent. A dynamic method for determining the shift points is required because of the variability and limited energy storage capacity of the secondary torque device relative to that of the engine. For example, the energy storage capacity of an electric battery, an accumulator containing pressurized fluid, and inertia of a flywheel, are limited and vary with operating conditions of the vehicle and the driver's demands for power due to road conditions and terrain.

Some current production hybrid vehicles use automatic transmission control strategies, which maintain a constant engine speed versus vehicle speed relationship. The secondary torque source is used as a torque supplement to operate the engine in the best Brake Specific Fuel Consumption BSFC condition. BSFC is the fuel flow rate per unit power output. It measures how efficiently an engine is using the fuel supplied to produce work.

In a step-change type transmission that produces discrete torque ratios or gear states, the state changes are not transparent. A decision to change gears should be made on the basis of the ability of the powertrain to remain in the next gear for an acceptable period. Otherwise, engine lugging and shift busyness occur.

When a secondary power torque source is active during vehicle acceleration, the load on the engine is reduced. A gear shift strategy that produces gear shifts on the basis of engine torque and vehicle speed relies on an assumption that an upshift should occur based on the engine torque requirements. But in a hybrid powertrain, engine torque requirements are less than if the secondary power source were not assisting the engine to accelerate the vehicle. If an upshift occurs without accounting for the torque availability of the secondary power source, however, the engine torque requirements could vary substantially after the upshift begins due to the loss of torque from the secondary power source. In the event of a reduction in the magnitude of torque provided by the secondary torque source after an upshift begins, an immediate downshift will occur, which will degrade performance feel and reduce driver satisfaction.

To provide consistent shift points, while maximizing both fuel economy and performance, it is preferred that an electronic controller that commands transmission gear changes, allows early upshifts, provided there is sufficient energy available to the secondary power source. If the secondary torque source can provide torque for a sufficient period after the upshift is initiated, the transmission could upshift earlier without the risk of an immediate downshift. This would improve fuel economy. The early shift point can either be located on an additional upshift line that passes through hybrid shift points or it can be located on a conventional, normal gearshift line relating actual engine torque and vehicle speed. When hybrid assist is available, the engine torque will be reduced, allowing earlier upshifts. For conventional gearshift scheduling, the engine torque required will be the total actual torque requirement, i.e., the sum of the engine torque and torque produced by the secondary power source. This torque sum is driver demand output torque. When maximum performance is required, based on acceleration greater than a calibrateable value, shift scheduling should be based on the total actual torque requirement, and early upshifts are inhibited.

SUMMARY OF THE INVENTION

A control according to this invention enhances fuel economy by allowing early upshifts, enhances drivability by minimizing shift busyness, provides consistent shift point determination, and is easily integrated with conventional gearshift point determination and control.

A method according to this invention is preferably used in a powertrain of a motor vehicle having an engine, a secondary power source, and a step-change automatic transmission for driving a load. The method, which controls an upshift of the transmission from a current gear to a next gear, includes the steps of establishing first shift points of a demanded engine output and a corresponding vehicle speed, at which the upshift would occur if the engine were the only power source. The length of a first period in which energy is available to the secondary power source is determined. The length of a second period for the current vehicle speed to increase to a target vehicle speed of a first shift point whose corresponding demanded engine output is equal to a combined current demanded output of the engine and secondary power source is determined. The upshift is produced if the length of the first period is equal to or greater than the length of the second period.

Stability of the upshift is ensured by the steps of defining second shift points of engine output torque and a corresponding vehicle speed, at which a downshift to the next lower gear from the current gear would occur if the engine were the only power source. A first torque magnitude required to be transmitted by the powertrain to the load for an upshift to occur at the current vehicle speed is determined from the second shift points. A second torque magnitude equal to the sum of a torque currently transmitted to the load by the engine and secondary power source is determined. The upshift is produced if the second torque magnitude is greater than the first torque magnitude.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figures 1, 3:
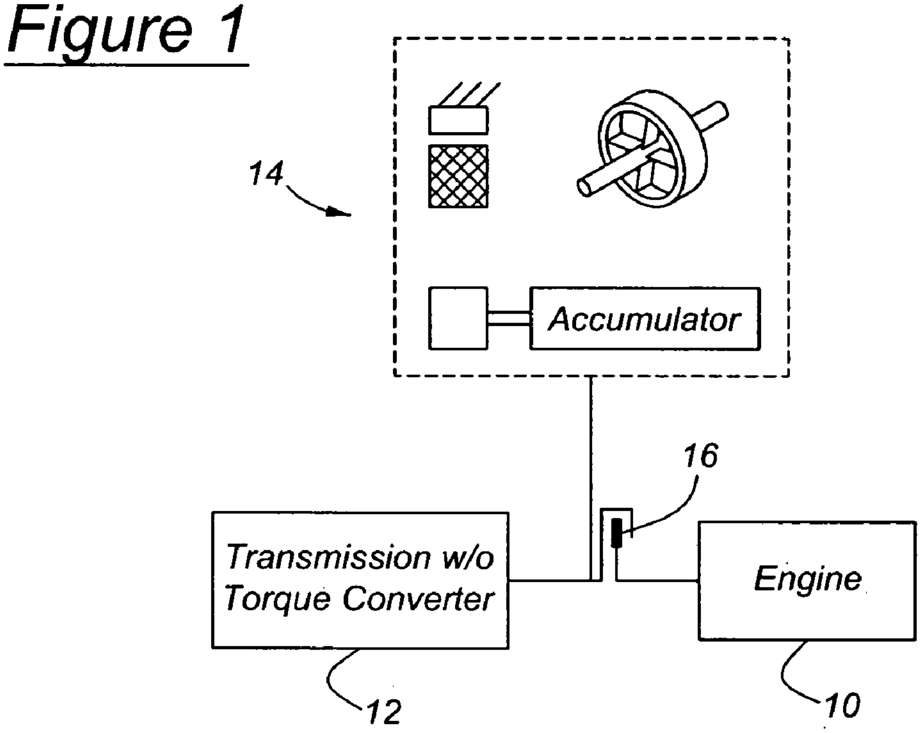
FIG. 1 is a schematic representation of a vehicle driveline including an engine, starter/generator or motor, input clutch, and automatic transmission.
FIG. 3 is a chart showing the engaged and disengaged state of the clutches and brakes of the transmission of FIG. 2, each state corresponding to a gear ratio produced by the transmission.

Referring now to the drawings, there is illustrated in FIG. 1 a gasoline-electric hybrid vehicle driveline that includes an internal combustion engine 10, a multiple speed ratio vehicle transmission 12 in which gear shifts are produced, an induction motor 14 located in the drive path between the engine 10 and transmission 12, and a friction clutch 16 located between the engine and the motor for driveably connecting and disconnect the engine and transmission. The rotor of the induction motor is connected directly to the torque input element of the multiple-ratio transmission. It is connected also to the engine crankshaft 10 through the friction clutch 16. However, the secondary power source is not limited to an electric motor supplied with power by an electric battery, as in FIG. 1. The secondary power source can be a hydraulic or pneumatic system, in which fluid, stored in an accumulator under relatively high pressure, drives the transmission input through a motor pump. Or the secondary power source can be a mechanical device such as a rotating flywheel or similar energy storage device and able to drive a load connected to the transmission output.

Figure 2:
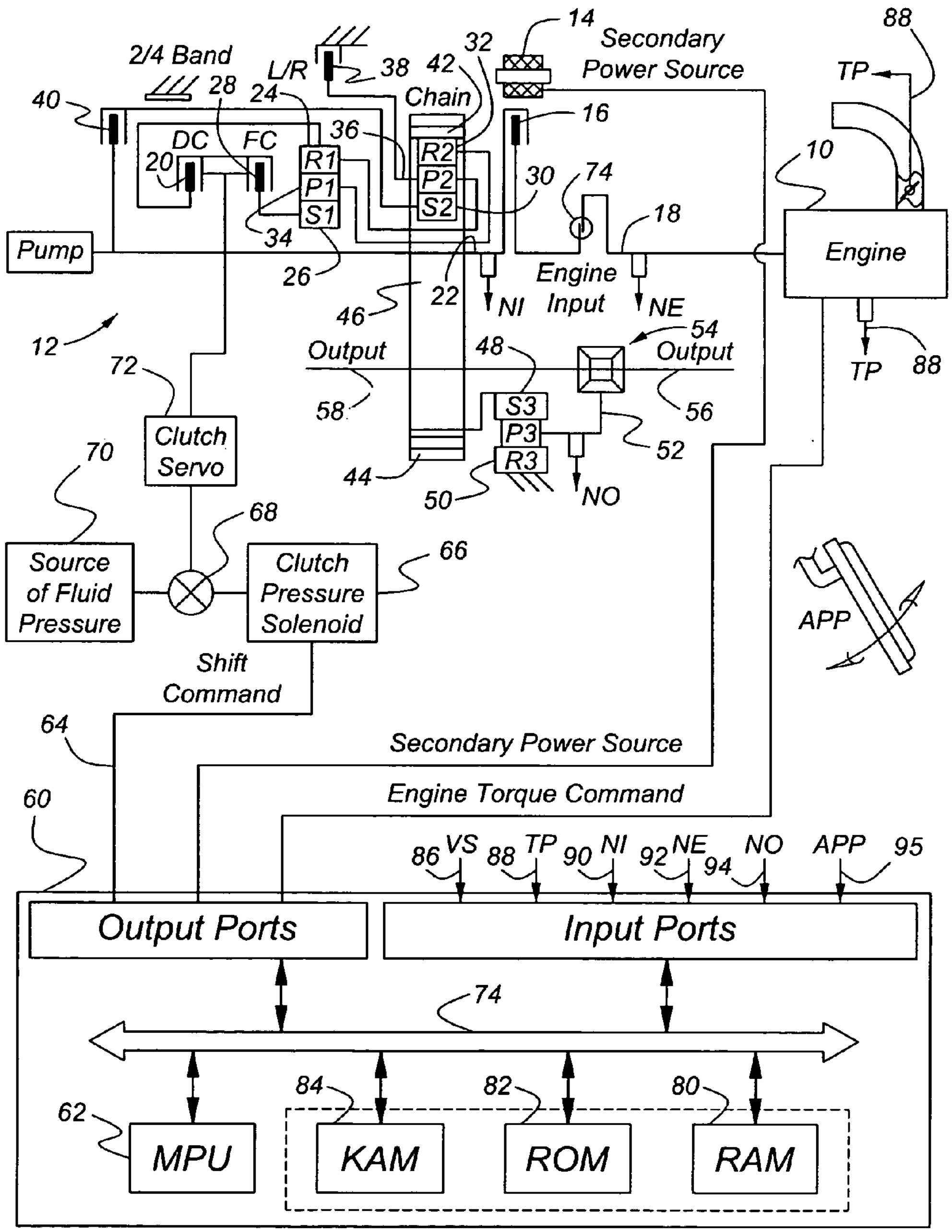
FIG. 2 is a schematic diagram showing transmission gearing, gear control elements, input clutch, electric motor, a controller.

FIG. 2 is a schematic representation of the gearing, clutches and brakes of the transmission of FIG. 1, and a control system for determining when to produce a gear change. The input shaft 22 of the transmission is connected to the torque input side of the clutch 16. The secondary power source 14 is arranged so that it transmits torque in parallel relationship with respect to the engine torque input. The direct clutch (DC) shown at 20 connects transmission input shaft 22 to the ring gear 24 of a first simple planetary gear unit. Sun gear 26 of the simple planetary gear unit is connected through a forward clutch (FC) shown at 28 to the shaft 22. Ring gear 24 is connected to sun gear 30 of a second planetary gear unit. The ring gear 32 of the second planetary gear unit is connected to the planetary carrier 34 of the first planetary gear unit. The planetary carrier 36 for the second planetary gear unit is braked selectively by low-and-reverse brake (L/R) 38. Transmission input shaft 22 is connected through reverse clutch (RC) 40 to the sun gear 30 and is engaged during the first ratio drive operation. The brake 38, during reverse drive operation, anchors planetary carrier 36.

FIG. 3 is a chart, which illustrates the state of the clutches and brakes of the transmission 12 for each of the gear ratios. First gear is achieved by engaging the forward clutch 28 and the low-and-reverse brake 38. Second forward drive ratio is achieved by engaging the forward clutch 28 and the 2/4 band brake. Direct drive or third drive ratio is achieved by simultaneously engaging the forward clutch 28 and the direct clutch 20, and fourth ratio or overdrive ratio is achieved by engaging the direct clutch 20 and the 2/4 band brake. Reverse clutch 40 and low-and-reverse brake 38 are engaged to produce reverse drive operation.

The ring gear 32 acts as a torque output element for the gearing. It defines a sprocket wheel 42, which drives a sprocket wheel 44 by means of a drive chain 46 engaged with both sprocket wheels. Sprocket wheel 44 drives the sun gear 48 of the final drive gear unit. The ring gear 50 of the final drive gear unit is anchored, and the planetary carrier 52 brings torque output to differential gearing 54, which transfers driving torque to each of two axle half shafts 56 and 58.

Preferably, controller 60 is a vehicle system controller (VSC), which controls the multiple torque sources, the engine 10, secondary power source 14, and transmission 12. However, this control could easily be incorporated into a transmission controller or engine controller. Use of a VSC is preferred since multiple torque sources need to be controlled, and it is preferred to have a controller that coordinates both torque producing subsystems based on driver requests.

Controller 60 receives signals generated by sensors, processes those signals, and uses the processed input signals to determine when to produce a shift command signal. Based upon this determination, the controller generates a command signal that causes the engaged and disengaged state of the friction elements, the friction clutches and brakes, to change. These engagements and disengagements alternately connect and disconnect elements of the planetary gear unit and cause gear ratio changes to occur, both upshifts and downshifts from the current gear. The controller also determines and commands the magnitude of torque to be produced by the secondary power source 14, such as by controlling the magnitude of current to be applied to the field windings of the motor.

In the preferred embodiment, controller 60 includes one or more digital microprocessors or digital computers 62, which cooperatively perform calculations, and execute subroutines and control algorithms. Controller 60 preferably generates a command or output signal 64, which is communicated to a solenoid 66 that operates a valve 68, which opens and closes a source of fluid pressure 70 to the servo 72 of a friction element of the transmission, such as direct clutch 20 or forward clutch 28. The command signal produced by controller 60 is interchangeably referred to as a shift command or clutch command.

Controller 60 produces a torque command output signal to the engine 10, which changes engine output torque in response to the command by changing at least one engine operating parameter, such as engine airflow, throttle position of the engine, ignition timing, engine air-fuel ratio, and fuel flow. In addition, controller 60 produces a torque command output signal to the secondary power source 14, which changes secondary power source output torque in response to the command.

Controller 60 is preferably a microprocessor-based controller, which provides integrated control of the engine 10, secondary power source 14, and transmission 12. Controller 60 includes a microprocessor MPU 62 in communication with input ports, output ports, and computer readable media via a data/control bus 74. Computer readable media may include various types of volatile and nonvolatile memory such as random access memory (RAM) 80, read-only memory (ROM) 82, and keep-alive memory (KAM) 84. These functional descriptions of the various types of volatile and nonvolatile storage may be implemented by any of a number of known physical devices including, but not limited to EPROMs, EEPROMs, PROMS, flash memory, and the like. Computer readable media include stored data representing instructions or algorithms executable by microprocessor MPU to implement the method for controlling input hydraulic pressure and motor torque according to the present invention.

Controller 60 is supplied with input signal representing vehicle speed 86 (VS), throttle position 88 (TP), transmission input shaft speed 90 (NI), engine speed 92 (NE), and transmission output shaft speed 94 (NO).

The Effect of Hybrid Assist on Upshifts

Transmission shift commands occur in each speed ratio or gear produced by the transmission with reference to a current operating condition, defined by vehicle speed and throttle position, in relation to a calibrated line relating those parameters. The controller 60 repetitively executes a control algorithm that determines whether a gearshift should occur. If the position of the current operating condition is above the line at which an upshift is to occur from the current gear, an upshift command is produced by the controller. If the position of the current operating condition is below the line at which an upshift is to occur from the current gear, a downshift command is produced by controller 60.

Figure 4:
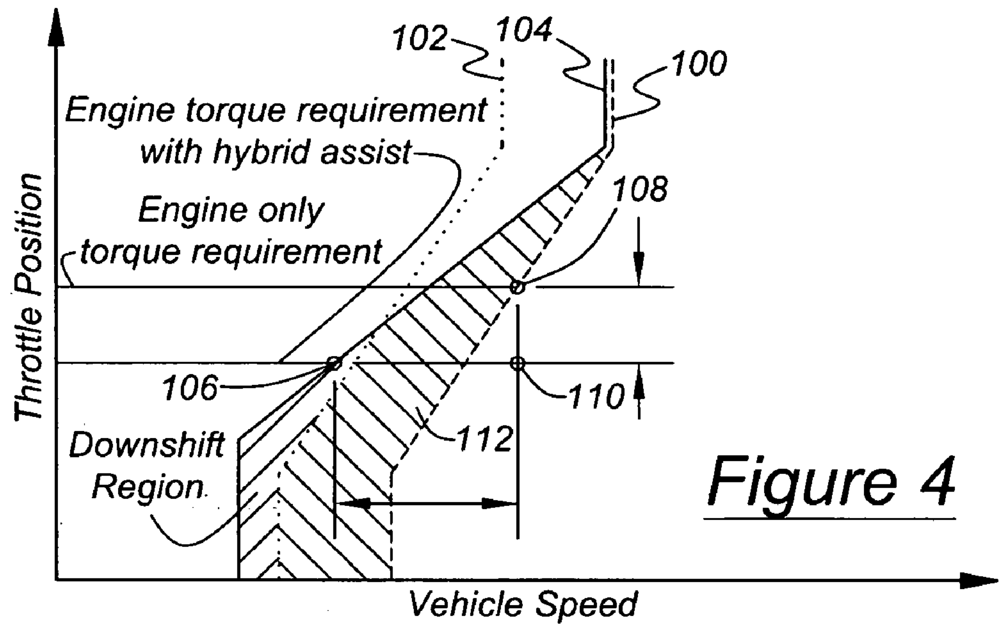
FIG. 4 shows the normal upshift and downshift lines for a single state change, along with a hybrid upshift line.

FIG. 4 shows the calibrated lines at which an upshift command and a downshift command are produced by controller 60 on the basis of the current vehicle speed and throttle position for a single state change, i.e., an upshift from the current gear to the next higher gear or a downshift from the current gear to the next lower gear. Line 100 represents a normal upshift line, i.e., the calibratable boundary line at which an upshift will begin when the current operating condition crosses line 100 from left to right with the engine 10 as the sole power source. Line 102 represents a normal downshift line, i.e., the calibratable boundary line at which an downshift will begin when the current operating condition crosses line 102 from right to left with the engine as the sole power source. Line 104 represents a hybrid upshift line, i.e., the calibratable boundary line at which an upshift will begin when the current operating condition crosses line 100 from left to right with the engine 10 and secondary power source both providing power to the load.

Reference to "calibratable" or "calibrated" means a scalar or function whose value is a predetermined magnitude, which can be deliberately changed or calibrated by altering the control algorithm to produce a desired performance characteristic of the powertrain. Calibrated functions are generally stored in electronic memory 82, the current magnitudes of which are determined from a look-up table with reference to another variable or a set of variables, the arguments or indexes of the function.

The hybrid control system of this invention allows upshifts to occur sooner, at 106, than would occur if only one source of power were driveably connected to the transmission input; provided the energy produced by the secondary power source 14 is sufficient to allow continuous operation up to the normal shift point. A normal shift point is located at 108. If no adjustment is made to the transmission shift strategy, then upshifts occur sooner in a hybrid powertrain due to the reduced engine torque requirements. If not properly controlled, this can lead to shift busyness.

FIG. 4 shows the difference between the gearshift schedule 100 and 102 for a powertrain having an engine power source (called "unassisted acceleration"), and the gearshift schedule 104 for a powertrain having an engine and a secondary power source (called "assisted acceleration"). Engine output torque at point 108 is greater than that at point 106. Lower engine torque is required to produce a command for an upshift at point 106 than at point 108 because engine torque is supplemented by torque produced by the secondary power source. Therefore, if the state change is allowed to occur early, at 106, the energy storage capacity of the secondary power source must be sufficient to maintain the torque until the normal shift line is reached.

FIG. 4 shows the normal upshift 100 and downshift lines 102, and a hybrid upshift line 104 for a single state change. Typically a secondary power source provides maximum torque near zero speed of the secondary device, i.e. substantially zero vehicle speed, with exponential decays in torque as speed increases after the secondary power source enters the constant power region. The torque availability of the secondary power source 14 is further limited by the available energy stored, such as in an electric battery, fluid accumulator, flywheel, etc. Therefore at low speed, additional torque is available, which will reduce the engine torque requirement and subsequently allow upshifts to occur sooner than the normal shift point. But as speed increases, the secondary power source has limited torque capability. Therefore, at higher speeds most of the required torque is supplied by the engine, which limits the hybrid shift. The gearshift line 104 will approach the normal shift line 100 at high speed.

Upshift Constraints when Secondary Torque is Available

If an upshift occurs at a hybrid shift point 106, and energy for the secondary power source is depleted immediately after the upshift and before the downshift line 102 is crossed by the current operating condition point, then an immediate downshift will occur. However, if energy for the secondary power source is depleted after the vehicle speed crosses the downshift line 102, then the upshift gear will be maintained, but engine lugging will likely occur, which will reduce both performance and performance feel. Ideally, energy for the hybrid device, or secondary power source, should be available until vehicle speed increases to the vehicle speed of point 108. Controller 60 commands an upshift point 108 when the current operating condition reaches the normal shift line 100 as vehicle speed increases. If energy from the secondary torque device is depleted after point 108 is reached, the effect on performance and shift stability will be minimized. Area 112 represents the engine lugging region. Point 110 represents an operating condition having the same throttle position as that of point 106 and the vehicle speed corresponding to that of point 108.

A goal of the control strategy is to allow the current vehicle acceleration to continue after the upshift. This requirement will be maintained as long as the vehicle acceleration is less than a calibrateable limit. At higher accelerations, a state change will result in reduced acceleration. If the state change is inhibited, then an upshift won't occur until engine speed limiting causes the upshift. However, at higher accelerations, the hybrid shift control and shift stability should be disabled.

Although a map of throttle position vs. vehicle speed is often used to define the shift point and to simplify the discussion of the hybrid shift strategy, shift control can be based on interpreting driver demand however it is expressed.

Gear shift determination can be based on a control variable such as transmission input/output torque, axle torque, power, vehicle speed, vehicle acceleration, etc. Driver demand can be interpreted from throttle position, accelerator pedal position, etc. A goal of this strategy is to assist in the state change determination, regardless of how the determination is made.

Upshift Stability

Figure 5:
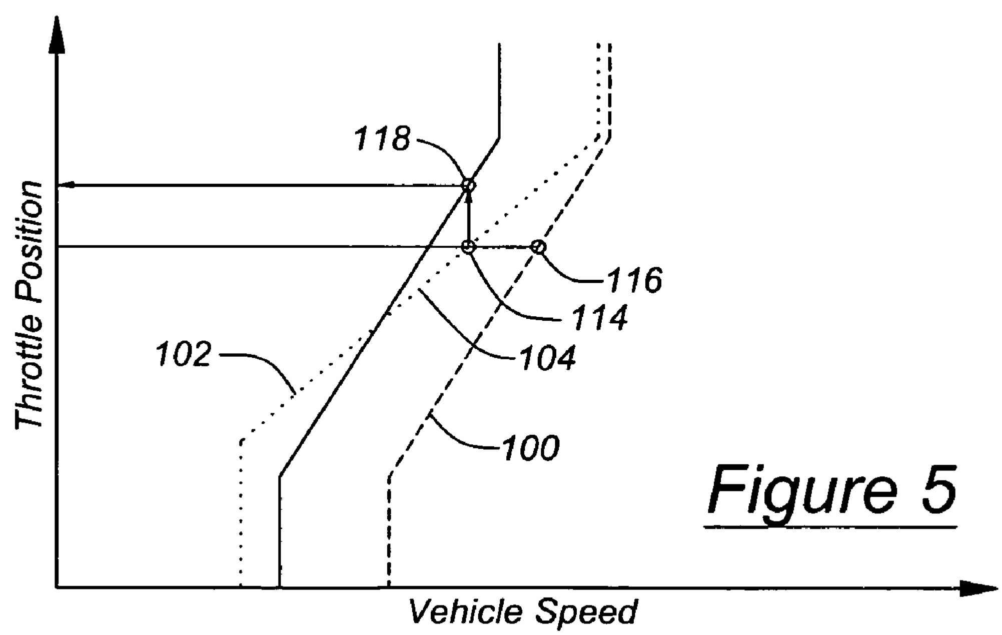
FIG. 5 is a shift map showing an upshift on the hybrid upshift line used to determine engine torque availability after the upshift.

If an upshift occurs at a point 114 on the hybrid shift line 104 shown in FIG. 5 and insufficient energy is available from the secondary power source 14 to cross the normal upshift line 100 at point 116, then it is necessary to determine if the upshift will be stable. An upshift is stable if the state change can occur without a downshift when no changes in driver demand or vehicle conditions occur.

Figure 6:
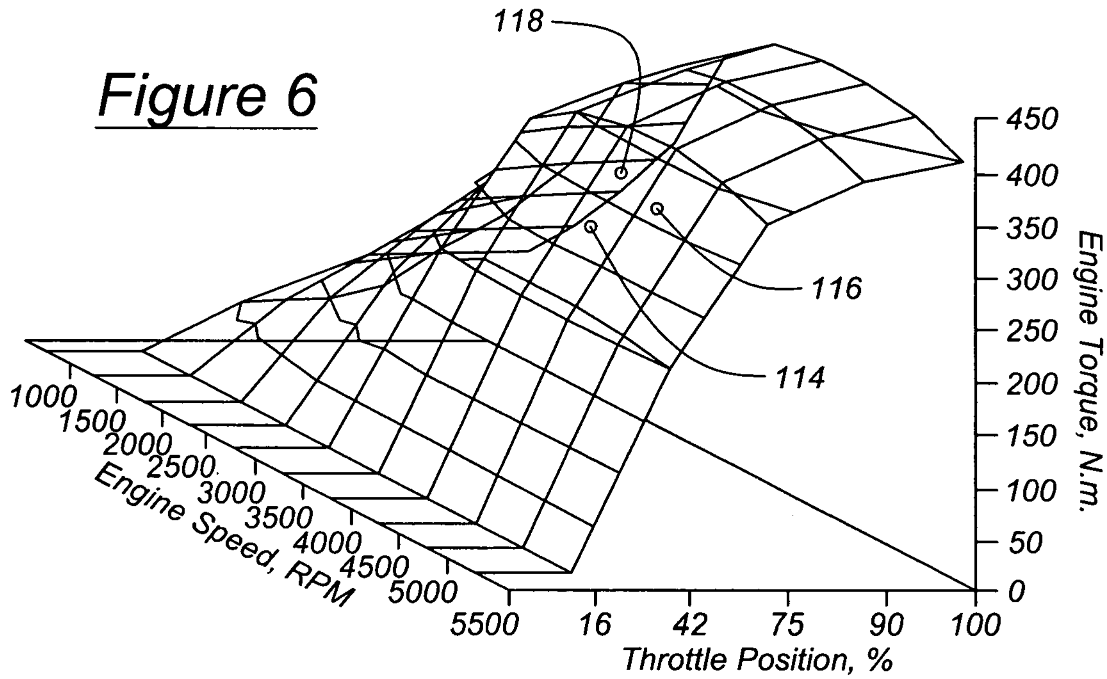
FIG. 6 is an engine torque map corresponding to the upshift points of FIG. 5.

For the upshift to be stable, the available torque at point 118 must be greater than the sum of the torques produced by the engine 12 and by the secondary power source 14 at point 114. The available torque is preferably compared downstream of any variable gear ratios, ideally at the transmission output or the axle. As can be seen in the engine torque map of FIG. 6, the torque at point 118 is greater than the torque that would normally be needed by the engine alone, which is shown as point 116.

Hybrid Upshift Control

For both hybrid shift control, which allows early upshifts, and shift stability, which inhibits upshifts until the torque availability in the upshifted state is greater than or equal to torque requirement in the current gear, use of this control strategy is confined to operating conditions wherein vehicle acceleration is low to moderate. When the rate of vehicle acceleration is high, shift points corresponding to normal operation or high performance operation are used, and a decrease in vehicle acceleration after the upshift is allowed.

Figure 7:
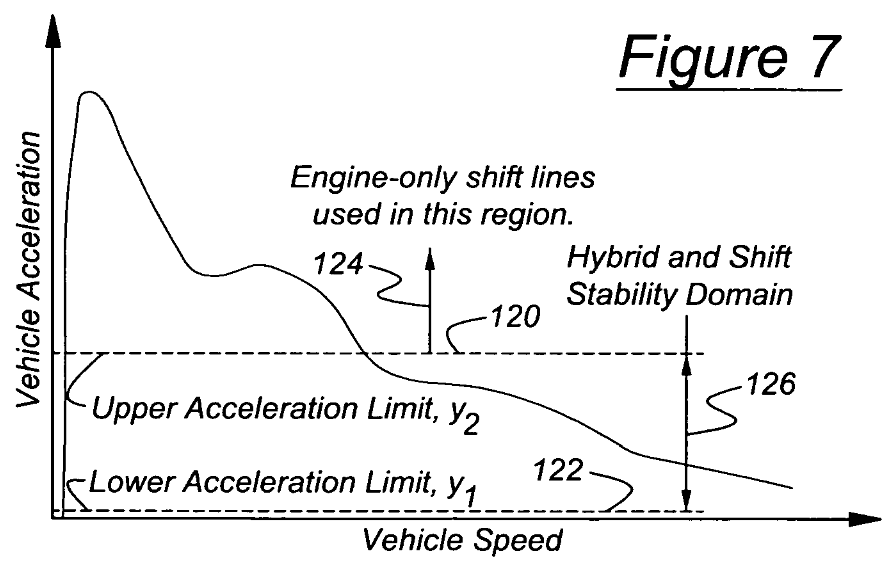
FIG. 7 is a graph of vehicle acceleration and vehicle speed showing upper and lower vehicle acceleration limits for hybrid shift control and shift stability.

FIG. 7 shows that the region to which this control is applicable is bounded by calibrateable upper 120 and lower 122 vehicle acceleration limits. The upper vehicle acceleration limit 120 marks the lower boundary of the domain 124 where engine-only gearshift state changes occur. The lower vehicle acceleration limit 122 marks the lower boundary of the domain 126 in which hybrid and shift stability criteria apply. The constraints are as follows:

If vehicle acceleration is less than the lower limit 122 (y1), then don't enter the hybrid shift control algorithm. The lower limit will be nearly equal to zero.

If vehicle acceleration is greater than the upper limit 120 (y2), then ignore the hybrid shift line and don't inhibit the upshift at the normal shift line.

Torque Availability

In order to determine the torque availability, it is necessary to determine the torque ratio for both the engine and the secondary power source. If the secondary power source torque device is connected to the load 15 at axles 56, 58 that are driveably connected to the transmission output 52 through a constant gear ratio, then there is no need to determine the torque after the upshift. Either the torque requirement remains the same after the gearshift as before the shift, or it is a ratio of the required torque when the gearshift or state change occurs.

Figure 8:
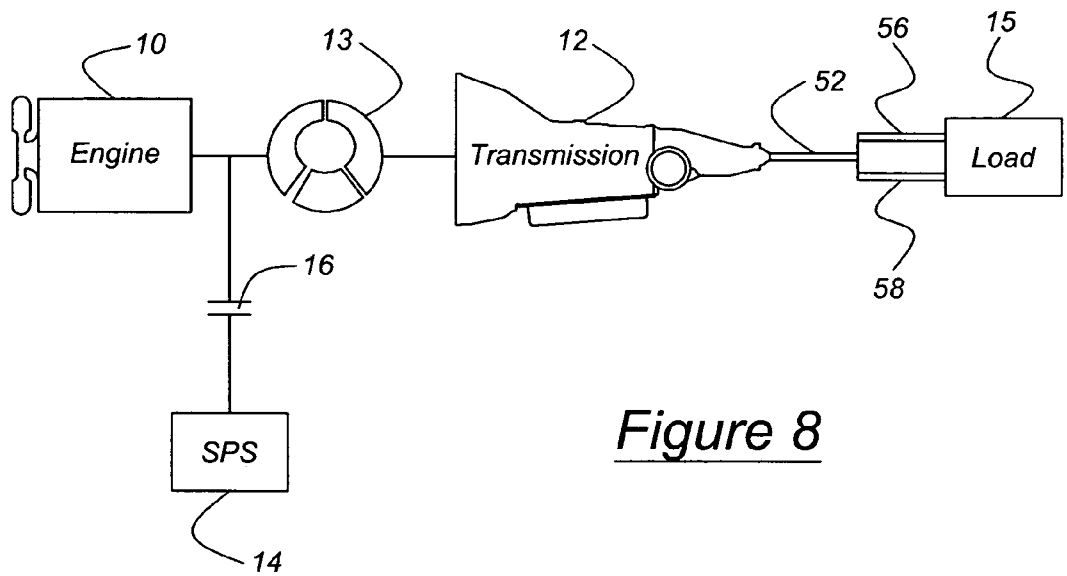
FIG. 8 is a schematic diagram of a powertrain to which this invention can be applied.

In a powertrain such as that shown in FIG. 8, where the torque produced by the engine 10 and secondary power source 14 is transferred to load 15 through an automatic transmission 12 via a torque converter 13, the torque ratio of the torque converter after the state change occurs must be determined. If it is assumed that the transmission output speed remains constant throughout the state change, then the torque converter operating point after the upshift can be determined as follows.

The engine speed after the state change is $$\omega_{Engine_{x+1}} = \frac{\omega_{Turbine_x}\left(\frac{Ratio_{x+1}}{Ratio_x}\right)}{Speed\ Ratio_{x+1}} \tag{1}$$

where 'x' is the current gear state, and 'x+1' is the upshifted gear state. The operating point of the torque converter after the upshift can be determined through the use of a 'k' factor, which can be based on pump speed and torque or turbine speed and turbine torque. The 'k' factor at the turbine is defined as $$k\ \ factor = \frac{\omega_{Turbine}}{\sqrt{\tau_{Turbine}}} \tag{2}$$

The relationship between turbine speed before and after the shift is $$\omega_{Turbine_{x+1}} = \omega_{Turbine_x}\left(\frac{Ratio_{x+1}}{Ratio_x}\right) \tag{3}$$

Turbine torque after the shift is $$\tau_{Turbine_{x+1}} = \tau_{Turbine_x}\left(\frac{Ratio_x}{Ratio_{x+1}}\right) \tag{4}$$

Substituting the relations (3) and (4) in equation (2), the 'k' factor after the state change is $$k\ \ factor_{x+1} = \frac{\omega_{Turbine_x}\left(\frac{Ratio_{x+1}}{Ratio_x}\right)}{\sqrt{\tau_{Turbine_x}\left(\frac{Ratio_x}{Ratio_{x+1}}\right)}} \tag{5}$$

Equation (5) can be simplified as follows $$k\ \ factor_{x+1} = k\ \ factor_x\left(\frac{Ratio_{x+1}}{Ratio_x}\right)^{\frac{3}{2}} \tag{6}$$

A torque converter has a performance map which shows the K-factor, torque ratio and efficiency as a function of the speed ratio. The torque and speed ratios are the difference between the input (pump or impeller) and the output (turbine) of the torque converter.

| Speed Ratio: $\frac{\omega_{Turbine}}{\omega_{Pump}}$ | K-Factor |
|---|---|
| 0.0 | 240 |
| 0.1 | 241 |

-continued

| Speed Ratio: $\frac{\omega_{Turbine}}{\omega_{Pump}}$ | K-Factor |
|---|---|
| 0.2 | 242 |
| 0.3 | 245 |
| 0.4 | 250 |
| 0.5 | 255 |
| 0.6 | 260 |
| 0.7 | 270 |
| 0.8 | 275 |
| 0.9 | 355 |
| 1.0 | 355 |

Using the K-factor versus speed ratio table and the turbine speed, the torque converter torque ratio after the state change can be determined with a table that is a function of speed ratio and turbine speed.

If the secondary power source shifts to a new operating point after the upshift, (due to the secondary device being upstream of the transmission, or some other ratio varying device) the rate-of-change of energy consumption must be determined. The energy consumption can be based on the total power required at the new operating point after the state change. The steady state power after the state change will be $$Power_{x+1}=\tau_{required_{x+1}}\omega_{x+1}+Power_{Loss} \quad (7)$$

When the state change begins, the hybrid torque device will begin to operate at the upshifted operating point, therefore, the energy availability determination must take into account the new operating requirements in order to ensure that adequate energy is available to allow the secondary power source to remain on-line until the normal shift line is crossed at the unassisted shift point.

Assuming the vehicle accelerates without any changes in the accelerator pedal position, the derivative of the energy consumption (i.e., power) will be monitored for use in energy availability. The length of the period that energy for the secondary power source is available is calculated as follows $$Time_{Energy\ Available}=\frac{Energy_{Current}-Energy_{Minimum}}{\frac{\partial}{\partial t}Energy_{Current}} \quad (8)$$

Figure 9:
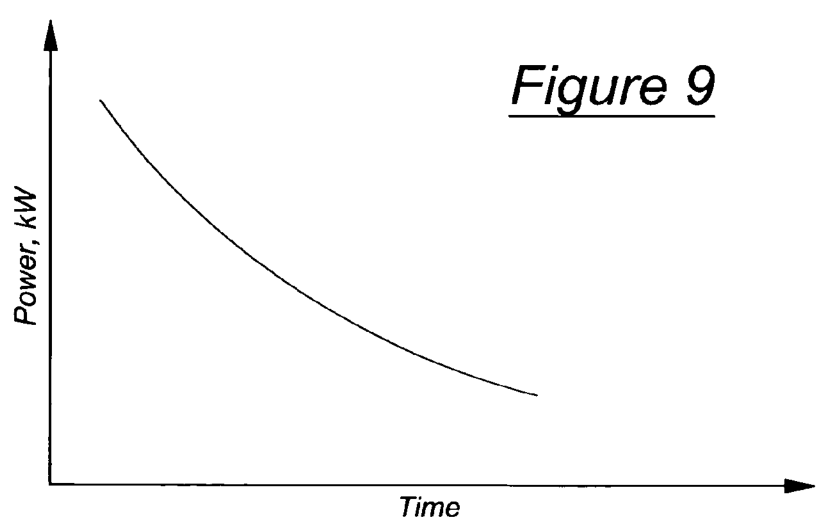
FIG. 9 is a graph of the time rate of change of energy available to the secondary power source during vehicle acceleration.

FIG. 9 is a graph of the time rate of change of energy available from the secondary power source during vehicle acceleration.

In addition, the vehicle acceleration is used to determine the amount of time necessary to move from the hybrid upshift line to the normal (unassisted) upshift line.

$$Time_{Required_{Minimum}}=\frac{Speed_{Vehicle(Normal\ Shift\ Point)}-Speed_{Vehicle(Hybrid\ Shift\ Point)}}{Acceleration_{Vehicle}} \quad (9)$$

Equation (9) is only valid when acceleration is non-zero. If acceleration is near zero, the hybrid upshift will be inhibited until the vehicle speed is close to the normal, unassisted upshift line.

If the condition for time availability is greater than the minimum time required, then an early upshift can be executed without added shift instability.

$$Time_{Energy\ Availability}\geqq TimeRequired_{Minimum} \quad (10)$$

If the torque capability of the secondary torque device is reducing with time, then the extra torque load must be applied to the engine. If the torque capability of the secondary device is less than a calibrateable amount or ratio, the hybrid upshift should be inhibited until the vehicle speed reaches the normal, unassisted shift line.

Vehicle Acceleration Determination

The determination of the actual vehicle acceleration is necessary to determine the length of the period necessary to move from the hybrid shift point to the conventional shift point. In order to accurately determine acceleration, a method that is stable and uses a digital signal (integer tooth counts) is used. A further constraint on the method is that delay in calculations be minimized. There are two methods, which meet this need: The Kalman filter method, which is an optimal observer; and the modified central difference method, which is based on a Taylor series expansion.

There are several methods of determining the energy within an accumulator, all of which depend on how the gas was expanded and compressed. The simplest is to use the isothermal energy equation, which provides the highest estimate of energy available. A second method is to assume the gas is compressed in an adiabatic process. The corresponding energy equation is then given in equation 2 of the attached document. The adiabatic process predicts a low energy level, due to the heating of the gas. A third method is to not assume that a particular process is to be followed, but rather, use the known states of the accumulator (i.e., pressure and temperature). The virial expansion is one method, based on statistical Physics, to accurately predict the energy within the accumulator.

The energy within a battery may be difficult to determine when the battery is connected to a load. The energy is a function of the temperature, memory effects present, the age of the battery, battery capacitance and battery internal resistance. The easiest method is to use the open circuit voltage of the battery. There is a linear relationship between the state of charge of the battery and the open circuit voltage as follows:

$$V_{Open\ Circuit}(t)=a_1SOC(t)+a_0$$

wherein, $a_0$ is the battery terminal voltage when SOC(t)=0%, and $a_1$ is obtained knowing the value of $a_0$ and $V_{Open\ Circuit}$ when SOC(t)=100%. The battery must be disconnected from the load.

To determine the state-of-charge while the battery is connected to a load, $$SOC_t=SOC_{t-1}-\frac{I_t\Delta t}{C(I_t,T_t)}\frac{1}{3600\ (\text{sec/hr})}$$

wherein, $I_t$ is the battery current, Δt is the sampling period, and C is the battery total discharge capacity as a function of current and temperature.

The state-of-charge for a capacitor energy storage system is determined by the fraction of the capacitor voltage divided by its maximum allowable voltage, or $SOC=V/V_{max}$, where $V_{max}$ is the capacitor voltage at 100% SOC. The power out of the capacitor is the product of voltage and current, or P=VI. Capacitance is defined as the ratio of charge over voltage C=q/V. Since current is charge per unit time, or Δ q/Δt, by substitution, the voltage change ΔV during a time increment Δt can be estimated by;

$$\Delta V = \frac{P\Delta t}{e_c CV}$$

wherein, C is the capacitance and $e_c$ is the capacitor efficiency. The voltage is updated by adding this voltage change to the initial voltage for the time increment.

The kinetic energy of a rotating body, such as a flywheel, is given by;

$$Energy_{Kinetic} = \frac{1}{2}J\omega^2$$

wherein, J is the moment of inertia of the flywheel system and ω is the angular velocity of the system. If the flywheel is a disk, then the energy is:

$$Energy_{Kinetic} = \frac{1}{4}mr^2\omega^2$$

wherein, r is the radius of the disk, and m is the mass of the disk.

Kalman Filter Acceleration Method

The linear Kalman filter, when used on a dynamic process were the observations are linear and the random processes are Gaussian white noise, will out perform any other filter, either linear or non-linear. The form of the Kalman filter for the estimation of vehicle acceleration is $$\frac{\partial x_1}{\partial t} = x_2 + k_1(u - x_1) \tag{11}$$

$$\frac{\partial x_2}{\partial t} = x_3 + k_2(u - x_1) \tag{12}$$

$$\frac{\partial x_3}{\partial t} = k_3(u - x_1) \tag{13}$$

The variable 'u' is the true position (based on a sensor reading) plus any white noise, therefore the value $(u-x_n)$ can be interpreted as the error of the estimate. The Kalman filter gains are determined from the system equations and the covariance matrix. The gains are chosen to minimize the error of the covariance matrix.

The form of the gain matrix is $$\begin{bmatrix} k_1 \\ k_2 \\ k_3 \end{bmatrix} = \begin{bmatrix} 2(V/W)^{1/6} \\ 2(V/W)^{1/3} \\ (V/W)^{1/2} \end{bmatrix} \tag{14}$$

The variable 'V' is an indicator of the randomness of the measured acceleration; the variable 'W' is an indicator of the random noise in making the acceleration measurement. Therefore, the ratio 'V/W' is interpreted as the signal-to-noise ratio. It can be seen that the filter gains all increase with increasing signal-to-noise ratio.

Equations 11–13 can be integrated directly and, if the initial conditions are set such that $x_1(0)$, $x_2(0)$, and $X_3(0)=0$, then the following system of equations result $$x_1(t)=x_2\Delta t+k_1(\text{error})\Delta t+x_1(t-1) \tag{15}$$

$$x_2(t)=x_3\Delta t+k_2(\text{error})\Delta t+x_2(t-1) \tag{16}$$

$$x_3(t)=k_3(\text{error})\Delta t+x_3(t-1) \tag{17}$$

The response of the Kalman filter will depend on the filter gains. For best response, the gains should be adjusted dynamically, which will result in increased response. Overall, the Kalman acceleration provides a robust method of determining vehicle speed and acceleration with minimal time delays and noise. Furthermore, the algorithm is simple to implement compared to other filtering methods, and it allows real time calculations that are accurate and computationally efficient.

Modified Central Difference Acceleration Method

When using digital data to determine acceleration, the modified central difference method allows for accurate acceleration prediction with minimal noise and delay. This method is based on a Taylor series expansion for pulse count, '$u_t$'. The central difference method uses points that are on either side of the current point which assists in smoothing-out the value. For the next time step, the pulse count is;

$$u_{t+1} = u_t + \left(\frac{\partial u}{\partial t}\right)_t \Delta t + \left(\frac{\partial^2 u}{\partial t^2}\right)_t \frac{\Delta t^2}{2!} + \left(\frac{\partial^3 u}{\partial t^3}\right)_t \frac{\Delta t^3}{3!} + \ldots \tag{18}$$

For the previous time step, the pulse count is;

$$u_{t-1} = u_t - \left(\frac{\partial u}{\partial t}\right)_t \Delta t + \left(\frac{\partial^2 u}{\partial t^2}\right)_t \frac{\Delta t^2}{2!} - \left(\frac{\partial^3 u}{\partial t^3}\right)_t \frac{\Delta t^3}{3!} + \ldots \tag{19}$$

Subtracting equation (19) from (18) and solving for the first derivative;

$$\frac{\partial u}{\partial t}_{t+1} = \frac{u_{t+1} - u_{t-1}}{2(\Delta t)} - O(\Delta t)^2 \tag{20}$$

The definition of a derivative is $$\frac{\partial f}{\partial t} = \lim_{\Delta t \to 0} \frac{f(t_o + \Delta t) - f(t_o)}{\Delta t} \tag{21}$$

The current time step derivative is $$\frac{\partial u}{\partial t}_t = \frac{u_t - u_{t-2}}{2(\Delta t)} - O(\Delta t)^2 \tag{22}$$

To determine the vehicle acceleration, equations (20) and (22) are used in the definition of a derivative, equation (21)

$$\frac{\partial^2 u}{\partial t^2}_t \cong \frac{u_{t+1} - u_t - u_{t-1} + u_{t-2}}{2(\Delta t)^2} \quad (23)$$

The traditional central difference method uses 3 points ($u_{t+1}$, $u_t$, $u_{t-1}$) and multiples '$u_t$' by 2. The advantage of the traditional central difference method is that it uses three time steps rather than four. However, one of the points is multiplied by 2, which can add to noise in the signal. In the modified central difference method, information from each of four time steps is used and each time step is weighted equally which reduces noise.

By using the tire revolutions per mile and the number of pulses per revolution, the vehicle acceleration in kph/sec can be determined.

$$Acceleration_{Vehicle} = \frac{3600 \dfrac{\text{sec}}{\text{hr}} [u_{t+1} - u_t - u_{t-1} + u_{t-2}]}{N \dfrac{revs}{km} n \dfrac{pulses}{rev}} \quad (24)$$

List of Symbols

| | |
|---|---|
| $\text{Acceleration}_{\text{Vehicle}}$ | Vehicle acceleration. |
| $\text{Energy}_{\text{Current}}$ | The current energy available in the energy storage device (accumulator, battery, flywheel, etc.,) |
| $\text{Energy}_{\text{Minimum}}$ | The minimum energy level allowed by the energy storage |
| $\partial\ \text{Energy}_{\text{Current}/\partial t}$ | The rate of change of energy consumption from the energy device.storage device. (power consumption) |
| $k_n$ | Kalman filter gains. |
| k factor | A performance rating for the torque converter. |
| $N_{\text{revs/km}}$ | The tire revolutions per mile. |
| $N_{\text{pulses/rev}}$ | The number of pulse counts per revolution used to determine position, speed, and acceleration. |
| Power | The operating power of the secondary torque device. |
| Ratio | Gear ratio for a particular state. |
| Speed Ratio | The speed ratio of the torque converter, $\text{S.R.} = \frac{\omega_{\text{Turbine}}}{\omega_{\text{Pump}}}$ |
| $\text{Speed}_{\text{Vehicle}}$ | Vehicle speed at which an upshift can occur based on the engine torque requirement. |
| t | Time |
| $\text{Time}_{\text{Energy Availability}}$ | The amount of time that energy is available in the energy storage device based on the current consumption rate. |
| $\text{Time, min}_{\text{Required}}$ | The amount of time for the vehicle speed to move from the hybrid shift line to the normal (unassisted) shift line. |
| u | Vehicle speed sensor position reading. (counts) |
| V | An indicator of the randomness of the measured acceleration. |
| VSC | Vehicle system controller. |
| W | An indicator of the random noise in making the acceleration measurement. |
| x | Current gear state. |
| $x_1$ | Estimated vehicle position. |
| $x_2$ | Estimated vehicle speed. |
| $x_3$ | Estimated vehicle acceleration. |
| x + 1 | Upshifted gear state. |
| $y_1$ | Lower acceleration limit. Defines the applicable control region. |
| $y_2$ | Upper acceleration limit. Defines the applicable control region. |

-continued

List of Symbols

| | |
|---|---|
| $\tau_{\text{Turbine}}$ | Torque converter turbine torque. |
| $\omega_{\text{Engine}}$ | Engine speed. |
| $\omega_{\text{Pump}}$ | Torque converter pump speed. |
| $\omega_{\text{Turbine}}$ | Torque converter turbine speed. |

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. In a powertrain of an accelerating motor vehicle having an engine, a secondary power source, and a step-change automatic transmission for driving a load, a method for controlling an upshift of the transmission from a current gear to a next gear, the method comprising the steps of:

establishing first shift points of a demanded engine output and a corresponding vehicle speed, at which the upshift would occur if the engine were the only power source;

determining the length of a first period in which energy is available to the secondary power source;

determining the length of a second period for the current vehicle speed to increase to a target vehicle speed of a first shift point whose corresponding demanded engine output is equal to a combined current demanded output of the engine and secondary power source;

comparing the lengths of the first period and second period; and producing the upshift if the length of the second period is equal to or greater than the length of the first period.

2. The method of claim 1, further comprising the steps of:

establishing second shift points of an engine output torque and a corresponding vehicle speed at which a downshift to the next lower gear from the current gear would occur if the engine were the only power source;

determining from the second shift points a first torque magnitude required to be transmitted by the powertrain to the load for an upshift to occur at the current vehicle speed;

determining a second torque magnitude equal to the sum of a torque currently transmitted to the load by the engine and secondary power source;

comparing the first and second torque magnitudes; and producing the upshift if the second torque magnitude is greater than the first torque magnitude.

3. The method of claim 1, wherein the step of determining the length of a first period, further comprises the steps of:

determining a first magnitude of energy currently available to the secondary power source;

determining a current time rate of energy consumed by the secondary power source at the current demanded engine output; and dividing the first energy magnitude by the current time rate of energy consumed by the secondary power source.

4. The method of claim 1, wherein the step of determining the length of a second period, further comprises the steps of:

determining a first difference between the target vehicle speed and the current vehicle speed;

determining a current vehicle acceleration; and dividing the first difference by the current vehicle acceleration.

5. The method of claim 1, wherein the step of determining the length of the second period comprises the steps of:

determining a current vehicle acceleration;

determining a current vehicle speed; and dividing the current vehicle speed by the vehicle acceleration.

6. The method of claim 1, wherein the step of determining the length of the second period comprises the steps of:

determining a current vehicle acceleration by the Kalman filter acceleration method;

determining a current vehicle speed; and dividing the current vehicle speed by the vehicle acceleration.

7. The method of claim 1, wherein the step of determining the length of the second period comprises the steps of:

determining a current vehicle acceleration by the Modified Central Difference acceleration method;

determining a current vehicle speed; and dividing the current vehicle speed by the vehicle acceleration.

8. The method of claim 1, wherein the step of determining the length of the second period comprises the steps of:

repetitively determining at frequent intervals a current vehicle speed; and determining the time rate of change of current vehicle speed between the intervals; and dividing the time rate of change of current vehicle speed between the intervals by the current vehicle speed.

9. The method of claim 1, further comprising:

determining a vehicle acceleration limit;

comparing a current vehicle acceleration and the vehicle acceleration limit; and while the current vehicle acceleration is equal to or greater than the vehicle acceleration limit, producing the upshift when a current demanded engine output and a current vehicle speed correspond to one of the first shift points.

10. In a powertrain of an accelerating motor vehicle having an engine, a secondary power source, and a step-change automatic transmission for driving a load, a method for controlling, with the aid of an electronic controller in communication with the engine and transmission, an upshift of the transmission from a current gear to a next gear, the method comprising the steps of:

inputting to the controller a data base including at least first shift points of a demanded engine output and a corresponding vehicle speed, at which the upshift would occur if the engine were the only power source;

repetitively inputting to the controller at frequent intervals a first magnitude of energy currently available to the secondary power source, a current time rate of energy consumed by the secondary power source at the current demanded engine output, a current vehicle speed, a current demanded engine output based at least in part on position of an accelerator pedal;

repetitively calculating in the controller at frequent intervals the time rate of change of current vehicle speed between the intervals, the length of a first period in which energy is available to the secondary power source, and the length of a second period for the current vehicle speed to increase to a target vehicle speed of a first shift point whose corresponding demanded engine output is equal to a combined current demanded output of the engine and secondary power source;

comparing in the controller the lengths of the first period and second period; and generating a command to initiate an upshift from the current gear to the next gear if the length of the second period is equal to or greater than the length of the first period.

11. The method of claim 10, further comprising the steps of:

inputting to the controller a data base further including second shift points of an engine output torque and a corresponding vehicle speed at which a downshift to the next lower gear from the current gear would occur if the engine were the only power source;

determining from the second shift points a first torque magnitude required to be transmitted by the powertrain to the load for an upshift to occur at the current vehicle speed;

determining a second torque magnitude equal to the sum of a torques currently transmitted to the load by the engine and by the secondary power source;

comparing the first and second torque magnitudes; and generating a command to initiate an upshift from the current gear to the next gear if the second torque magnitude is greater than the first torque magnitude.

12. The method of claim 10, wherein the step of calculating the length of a first period, further comprises the steps of:

repetitively further inputting to the controller at frequent intervals a first magnitude of energy currently available to the secondary power source, and a current time rate of energy consumed by the secondary power source at the current demanded engine output; and calculating in the controller at frequent intervals the length of the first period by dividing the first energy magnitude by the current time rate of energy consumed by the secondary power source.

13. The method of claim 10, wherein the step of calculating the length of the second period, further comprises the steps of:

calculating in the controller at frequent intervals a first difference between the target vehicle speed and the current vehicle speed, a current vehicle acceleration, and dividing the first difference by the current vehicle acceleration.

* * * * *